United States Patent [19]

Billeter

[11] 4,417,767

[45] Nov. 29, 1983

[54] EMPTY AND LOAD BRAKE SYSTEM WITH SEPARATE PROPORTIONAL VALVE AND LOAD SENSOR VALVE MEANS

[75] Inventor: Henry R. Billeter, Marco Island, Fla.

[73] Assignee: Sloan Valve Company, Franklin Park, Ill.

[21] Appl. No.: 391,490

[22] Filed: Jun. 24, 1982

[51] Int. Cl.³ .............................. B60T 8/18; B60T 8/20
[52] U.S. Cl. ................................... 303/23 R; 188/195
[58] Field of Search ...................... 303/23 A, 40, 23 R, 303/54, 22 A, 22 R, 6 C, 6 R; 188/195, 349; 267/8 C

[56] References Cited

U.S. PATENT DOCUMENTS 3,671,086  6/1972  Scott ................................. 303/23 R
4,235,478  11/1980  Billeter ............................. 303/23 R Primary Examiner—Douglas C. Butler
Attorney, Agent, or Firm—Kinzer, Plyer, Dorn & McEachran

[57] ABSTRACT

An empty and load brake device for a railroad vehicle air brake system includes an air pressure source, a control valve, a proportional valve and a brake cylinder all connected in series. A load sensor valve is in fluid communication with the line between the proportional valve and the brake cylinder. If the sensor valve senses an empty load condition, it actuates the proportional valve to decrease the air pressure supplied to the brake cylinder. The load sensor valve has a rock and roll spring which dampens movement caused by rough track conditions, thereby preventing erroneous indications of either an empty or loaded car.

6 Claims, 3 Drawing Figures

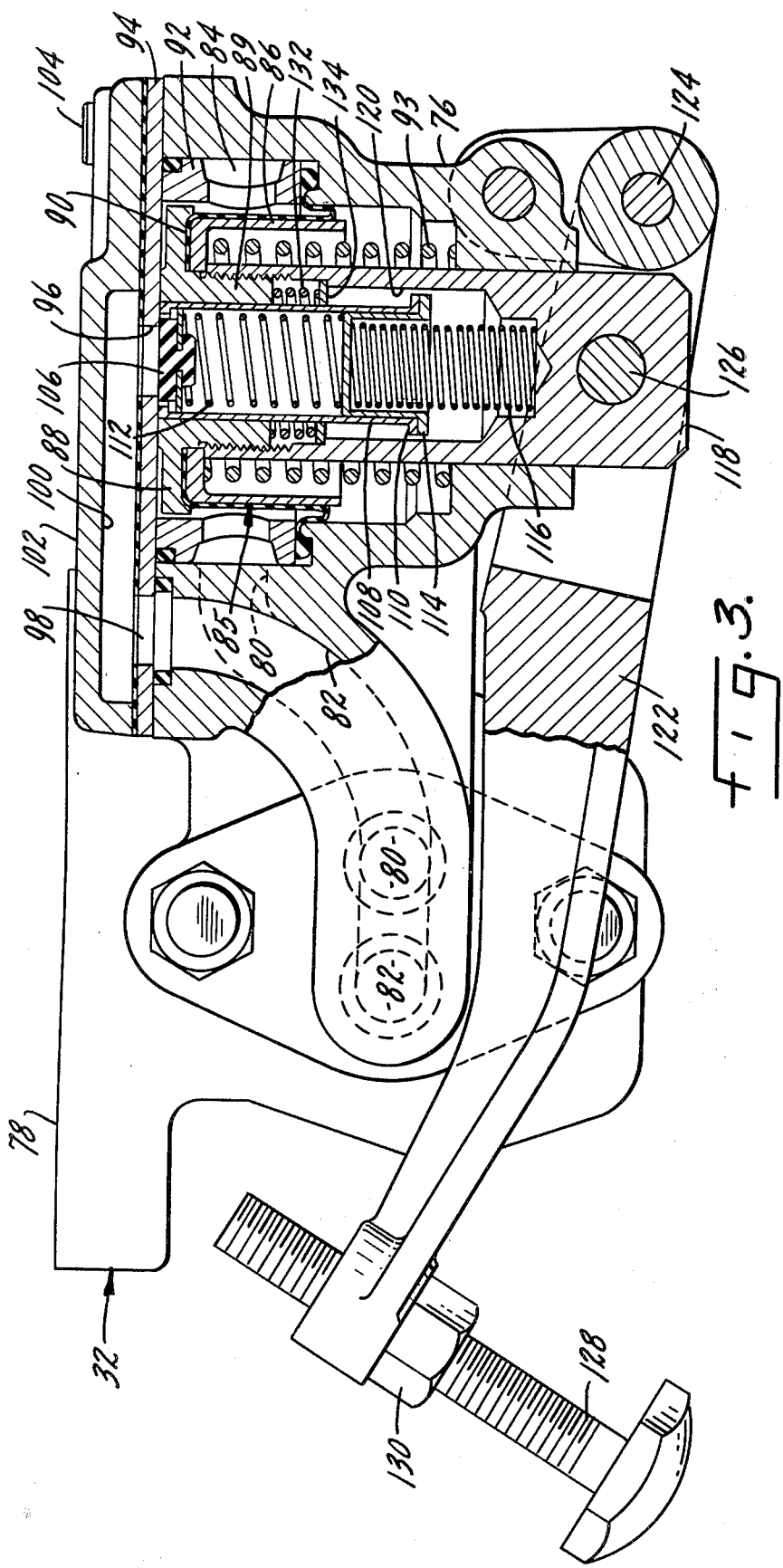

EMPTY AND LOAD BRAKE SYSTEM WITH SEPARATE PROPORTIONAL VALVE AND LOAD SENSOR VALVE MEANS

SUMMARY OF THE INVENTION

The present invention relates to empty and load brake devices for railroad vehicles and is particularly concerned with a load sensor having dampening means for cancelling the effect on the load sensor of rock and roll caused by rough track conditions.

One purpose of the invention is an empty and load device of the type described which prevents rough track conditions from providing a false indication of car loading.

Another purpose is a load sensor valve for an empty and load brake device which has a lockout feature in that once the brake system begins to proportion the air pressure to the brake cylinder, the system cannot return to a non-proportioning condition on that particular brake application.

Another purpose is a device of the type described wherein during brake release, air is vented through the retainer valve in a normal manner so that air is not vented locally at the load sensor valve which prevents accidently pumping or bleeding the air off at this point in the system.

Other purposes will appear in the ensuing specification, drawings and claims.

BRIEF DESCRIPTIONS OF THE DRAWINGS

FIG. 3 is a sectional view of a load sensor valve according to the present invention.

DESCRIPTION OF A PREFERRED EMBODIMENT

Figure 1:
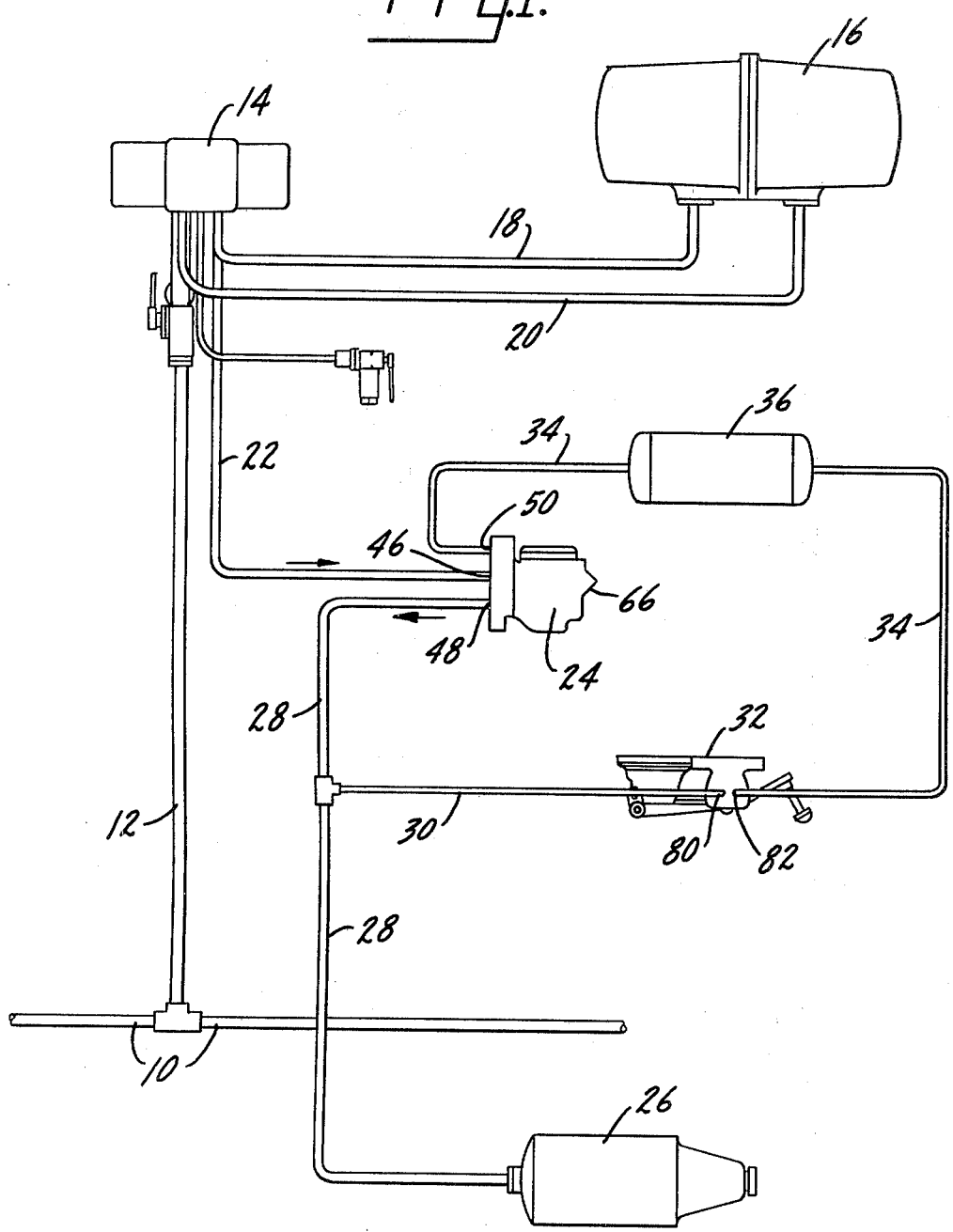
FIG. 1 is a schematic illustration of an empty and load device incorporated in a railroad vehicle brake system.

FIG. 1 illustrates the components of a railroad vehicle air brake system including an empty and load device. This system includes a main air supply line 10 which runs from car to car in a train. A branch pipe 12 supplies air to the conventional ABD control valve 14. Air is stored in the combined auxiliary and emergency reservoir 16 which is connected to the control valve 14 by lines 18 and 20.

The control valve 14 supplies air pressure to the brake cylinder through a control pipe 22. The control pipe is connected to a load proportional valve 24 which in turn is in communication with the brake cylinder 26 through a brake cylinder pipe 28. During application of the brakes air flows through the control pipe 22 and the brake cylinder pipe 28 in the direction of the arrows shown.

Branching off of the brake cylinder pipe 28 is the load sensor line 30. The load sensor line is connected to the load sensor valve 32. The outlet of the load sensor valve is connected to the top of the proportional valve 24 through a feedback line 34. The feedback line includes an equalizing volume 36.

Figure 2:
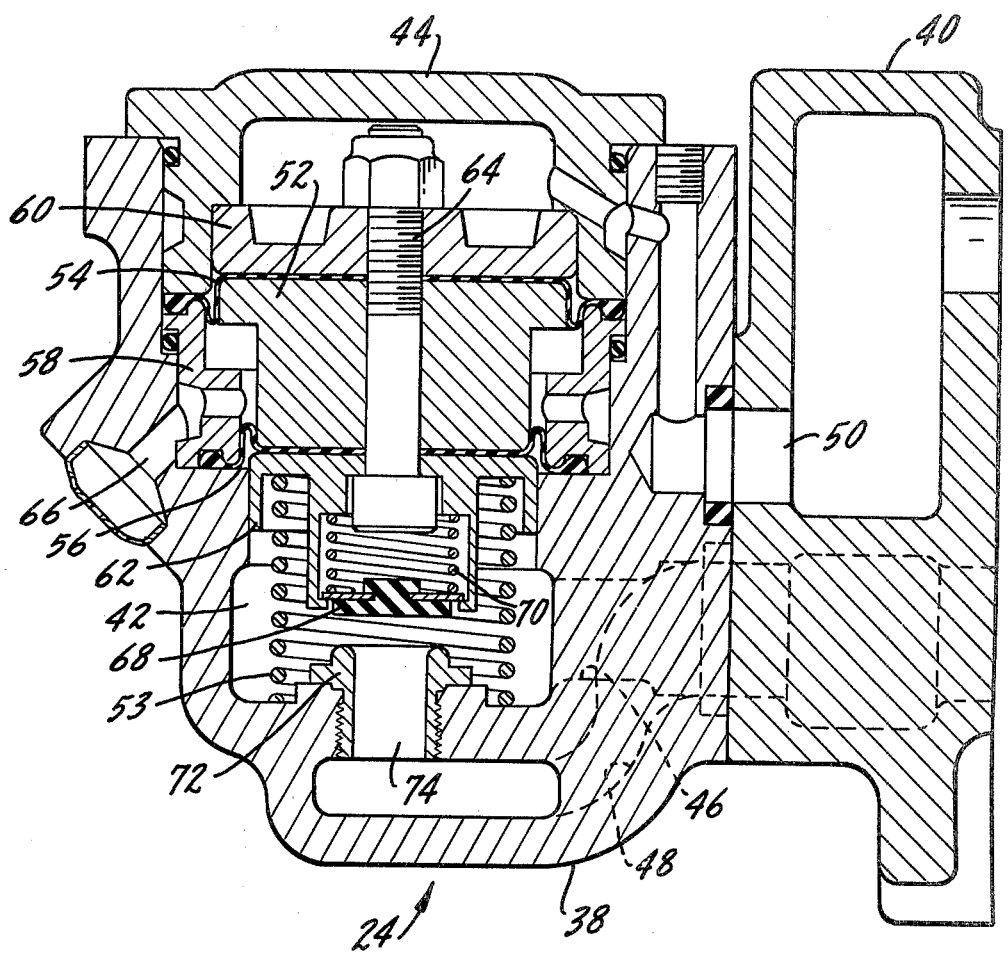
FIG. 2 is a sectional view of a load proportional valve.

FIG. 2 shows the details of the load proportional valve 24. The valve has a body 38 which may be connected to a suitable mounting bracket 40. The valve body has a central cavity 42, the top of which is closed by a cover plate 44. Also formed in the body 38 are an inlet passage 46 and an outlet passage 48. The inlet passage is connected to the control line 22 (see FIG. 1) and the outlet passage 48 is connected to the brake cylinder pipe 28. A third passage 50 connected to the feedback pipe 34 is in communication with the upper half of the proportional valve.

A piston 52, disposed in the cavity 42 of the valve body, is supported by a main spring 53. Upper and lower rolling diaphragms 54 and 56 are positioned on the top and bottom of the piston 52. The lower diaphragm 56 is clamped to a shoulder of the valve body by a liner 58. The upper diaphragm 54 is secured at its periphery between the liner 58 and the cover plate 44. A clamp plate 60 holds the central portion of the upper diaphragm in contact with the piston 52. The central portions of the lower diaphragm is held in contact with the piston by a valve retainer 62. The valve retainer 62 is itself held in place by a socket head cap screw 64. The space between the upper and lower diaphragms is vented through a port 66.

The valve retainer 62 carries a valve disk 68 which is urged downwardly by a valve spring 70. A valve seat 72 is threaded into the valve body. The valve seat has a throat 74 which provides fluid communication from the cavity 42 to the outlet passage 48.

FIG. 3 shows the load sensor valve 32 of the present invention. The valve includes a body 76 connected to an appropriate mounting bracket 78. The valve 32 is conventionally mounted on the car body by the bracket 78.

An inlet passage 80 is formed in the valve body. The load sensor line 30 connects to the inlet passage. There is also an outlet passage 82 formed in the valve body which connects to the feedback line 34. The inlet passage 80 is in communication with a valve chamber 84. The chamber 84 is divided into an upper and lower portion by a piston 85 which includes a cup-shaped piston element 86, a piston head 88 and a rolling diaphragm 90. The piston head 88 has a depending skirt 89 which fits through an opening in the piston element 86. The diaphragm 90 is clamped at its center between the piston 86 and the piston head 88. The periphery of the diaphragm is clamped against a shoulder of the valve body by a clamp ring 92. The piston, including the piston element 86, piston head 88 and diaphragm 90, is supported in the valve body cavity 84 by a main spring 93.

The top of the valve body is generally closed by a valve plate 94. The plate has openings 96 and 98 connected by a passage 100, to provide fluid communication between the upper half of chamber 84 and the outlet passage 82. The passage 100 is formed in a top cover 102 which is secured to the valve body by socket head cap screws 104.

Air flow through the valve is controlled by a valve means. The valve means includes a poppet valve 106 disposed in a valve retainer sleeve 108. There is a flange 110 at the base of the valve retainer 108. The poppet valve 106 is urged toward the valve plate 94 by a valve spring 112. The valve spring 112 rests at one end against a spring seat 114 which fits into one end of the valve retainer 108. The entire valve means is supported by an inner spring 116. The valve retainer 108 is slidable within a cylinder formed in the piston head 88.

The bottom of the inner spring 116 rests on a plunger 118. The plunger is slidable in an opening in the bottom of the valve body and extends to a point outside of the body. The inner spring 116 and the valve means are disposed within a hollowed out portion 120 of the plunger 118. The piston element 86 rests on the top surface of the hollowed out portion of plunger 118. The piston is held in place by the piston head whose skirt 89 is threaded into the plunger 118.

A load sensor arm 122 is pivotally connected to the valve body by a pin 124. The sensor arm is also connected to the plunger 118 by a plunger pin 126. The free end of the sensor arm has an adjusting bolt 128 whose position is adjustably fixed by a lock nut 130.

A rock and roll spring 132 is disposed between the piston head skirt 89 and the valve means. The rock and roll spring 132 normally bottoms on a washer 134 and the washer itself is supported by a shoulder on the surface of the hollowed out portion 120 of the plunger 118. As will be more fully explained below, the rock and roll spring prevents rough track conditions from erroneously indicating an empty or loaded condition.

APPLICATION OF THE BRAKES ON A LOADED VEHICLE

The brake system of the present invention operates on a loaded vehicle in the following manner. The auxiliary reservoir 16 is charged through the main supply pipe 10, branch pipe 12, control valve 14 and reservoir line 20. When the brakes are to be applied, the control valve 14 connects the auxiliary reservoir 16 to the brake pipe 22. Air flows to the inlet passage 46 of the porportional valve (FIG. 2) and into the chamber 42. The main spring 53 holds the piston assembly in a raised position wherein the valve disk 68 is spaced from the valve seat 72. Thus, air flows down through the throat 74 into the outlet passage 48 and into the brake cylinder pipe 28. This connects the air supply to the brake cylinder 26 thereby actuating the cylinder. The air supply is also connected to the load sensor pipe 30.

Air in the load sensor pipe 30 enters the inlet passage 80 of the load sensor valve 32. From there it enters the upper half of chamber 84. There is a small gap between the top surface of the piston head 88 and the valve plate 94. Pressure acting on the piston head urges the piston assembly and plunger 118 downwardly. However, the piston will not move until the upward force of the main spring 93 is overcome. The spring 93 is sized so that about twelve pounds per square inch pressure is required to overcome the spring. The minimum service pressure of the brake cylinder is about ten pounds per square inch. So the load sensor valve will not be affected by pressure in the brake cylinder line until the cylinder has already begun to operate.

When the threshold pressure is reached in chamber 84 of the load sensor, the piston assembly and plunger 118 begin to move downwardly. The poppet valve 106 initially remains closed against the opening 96 of the valve plate 94 due to the urging of valve spring 112 and the air pressure on the underside of the poppet valve. As the plunger 118 moves downwardly it causes the load sensor arm to pivot in a counter clockwise direction about the pin 124. However, since the car is loaded the adjustment bolt 128 will strike the truck side frame after little or no movement of the plunger and sensor arm. Thus, the sensor arm is prevented from rotating and the valve retainer 108 will not be moved downwardly to open the poppet valve 106. So the load sensor valve opening 96 remains closed and no air is supplied to the feedback line 34. The proportional valve remains open and full air pressure from the auxiliary reservoir is supplied to the brake cylinder 26.

It is in the fully loaded condition that the rock and roll spring 132 performs its most critical function. While the load sensor arm 122 is normally prevented from rotation when the car is loaded, such rotation may nevertheless occur due to rock and roll conditions generated by a curve in the track or rough track. Whatever the cause, there may be instances where the car body and the truck side frame will momentarily separate, allowing the load sensor arm 122 to rotate downwardly in the same manner as it would if the car were empty. When the sensor arm rotates in this manner the plunger 118 pulls the piston downwardly until the washer 134 is in contact with the flange 110 of the valve retainer sleeve 108. If the washer were fixed on the plunger further downward movement of the plunger would cause the valve retainer to move downwardly, carrying with it the poppet valve 106 which would open the valve opening 96. As discussed more fully below this would initiate a proportioning operation wherein the brake cylinder would not be supplied with the full air pressure available in the auxiliary cylinder. Since the car is actually in a loaded condition proportioning of the available air supply is not desired. However, the rock and roll spring 132 prevents this undesired proportioning from occurring. When the washer 134 contacts flange 110 due to momentary rotation of the sensor arm and the attendant dropping of the plunger 118, the rock and roll spring 132 provides an extra margin of downward piston motion before the valve retainer will be displaced. Thus the rock and roll spring dampens fluctuatons in the piston location relative to the valve retainer.

Release of the brakes is performed in the conventional manner.

APPLICATION OF THE BRAKES ON AN EMPTY VEHICLE

When the railroad vehicle is empty, the operation of the brakes starts out the same as described above. But when the car is empty the adjustment bolt 128 of the sensor arm 122 will clear the truck side frame. Thus the arm is free to rotate in a counterclockwise direction about pin 124. The plunger 118 carries the piston 86 and the piston head 88 downwardly, eventually causing contact between the washer 134 and the flange 110 of the valve retainer sleeve 108. As the piston continues downwardly the rock and roll spring 132 will be compressed until the downward force on the valve retainer sleeve will overcome the upward force supplied by the valve spring 112 and the inner spring 116. The poppet valve 106 is pulled away from the opening 96 and the load sensor valve opens. Air then flows into the connecting passage 100, to the outlet passage 98 and from there into the feedback line 34 and equalizing volume 36.

It will be noted at this point that once the poppet valve 106 opens, it will have equal air pressure on either side of it and it cannot be reclosed during that cycle of the brake application. It can only be closed after the brakes are released. This provides a lockout feature in that once proportioning begins it is impossible to go back to a nonproportioning condition on that particular brake application.

The proportioning valve operates in the following manner. Air pressure from the feedback line 34 is supplied to the inlet channel 50 of the proportional valve 24

(FIG. 2). Since the clamp plate 60 has a greater surface area than the valve retainer 62, the pressure in the top of the proportional valve will cause the piston assembly to move downwardly. This continues until the valve disk 68 closes upon the valve seat 72 thereby cutting off the flow of air through the proportional valve. This in turn cuts off the air supply to the feedback line through the open load sensor valve 32. The main spring 53 then overcomes the pressure in the top of the valve and causes the piston assembly to return to its raised position, thereby reopening the flow through the proportional valve. As pressure is restored to the feedback line the piston will again move back down and close upon the valve seat 72. The piston will continue to modulate between an open and closed position in this manner throughout the brake application cycle. The clamp plate 60 and the valve retainer 62 together with the main spring 53 are sized to operate such that approximately sixty percent of the available pressure in the auxiliary reservoir 16 is provided to the brake cylinder 26.

Whereas the preferred form of the invention has been shown and described herein, it should be realized that there may be modifications, substitutions and alterations thereto.

The embodiments of the invention in which an exclusive property or privilege is claimed are as follows:

1. In an empty and load device of a railroad vehicle air brake system of the type having an air pressure source, a control valve connected to said source, a proportional valve connected to said control valve, a brake cylinder connected to said source through said control valve and proportional valve, and a load sensor valve connected to the line between the proportional valve and brake cylinder with a feedback line from the load sensor valve to the proportional valve for controlling the application of air through said proportional valve to said air cylinder, said load sensor valve having:
   a valve body having a chamber therein and an air inlet and an outlet;
   valve means for controlling air flow between the inlet and outlet;
   a piston movable within the valve chamber to control the position of the valve means;
   a load sensing arm pivotally attached to the valve body and connected to the piston; and
   a rock and roll spring disposed between the piston and the valve means for dampening movement of the piston relative to the valve means so as to prevent rough track conditions from simulating a loaded or unloaded vehicle.

2. The device of claim 1 wherein the inlet and outlet are in communication with the valve chamber.

3. The device of claim 1 wherein the valve body includes a valve plate generally closing the top of the valve chamber, with an opening therein which provides a seat for the valve means.

4. The device of claim 3 further including a top cover rigidly connected to the valve body and having an air passage connecting the opening in the valve plate to the outlet.

5. The device of claim 1 wherein the valve means comprises, a valve retainer, a valve spring disposed within the retainer, a spring seat fitted into one end of the valve retainer and a valve disk located in the retainer where it is urged toward the other end of the retainer by the spring.

6. The device of claim 5 wherein the valve retainer has an external flange at its one end and the rock and roll spring is disposed about the valve retainer above the flange.

* * * * *